May 13, 1958     A. J. FRIEDMAN     2,834,483
SILAGE DISTRIBUTOR AND SUPPORTING STRUCTURE THEREFOR
Filed Dec. 21, 1955
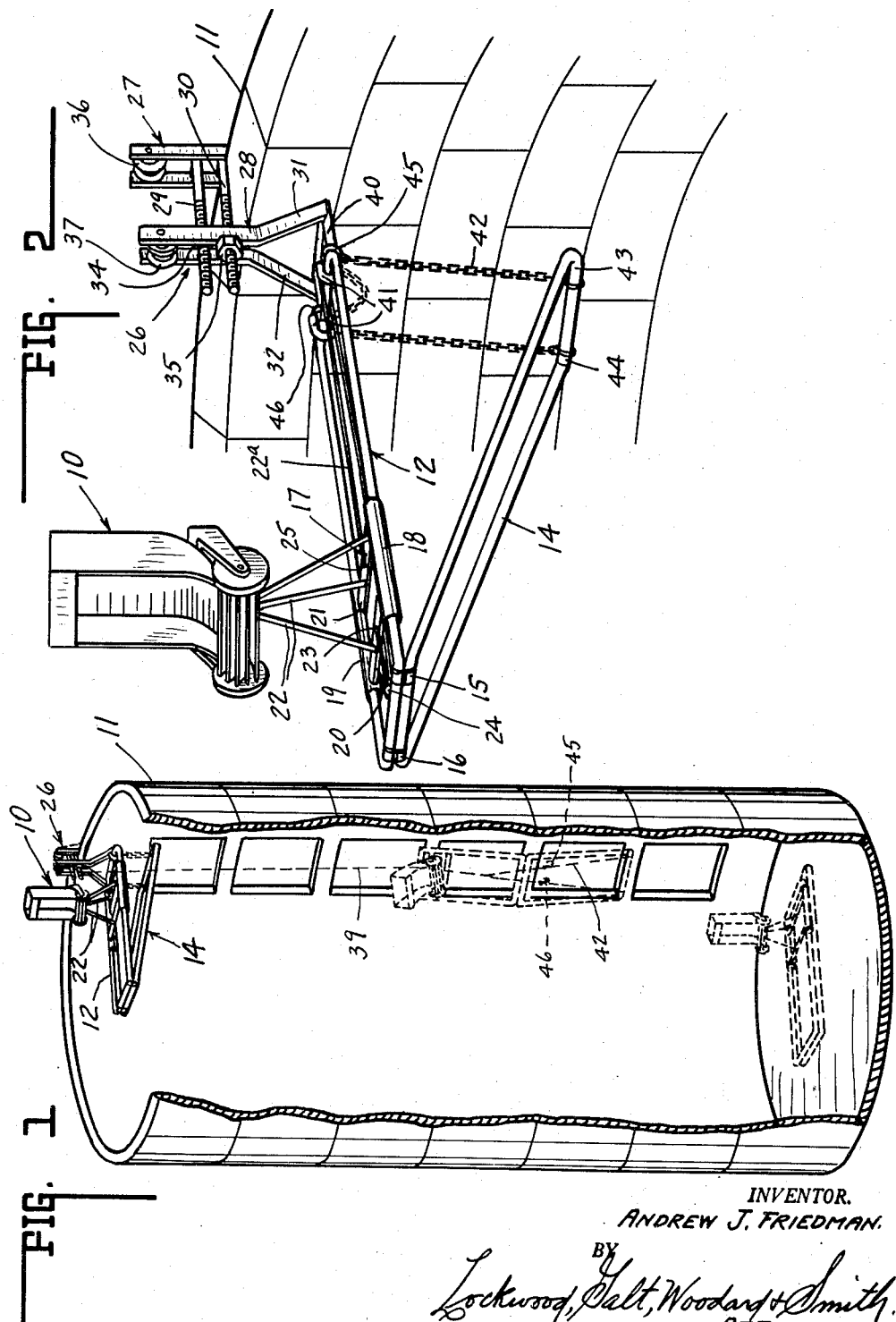
INVENTOR.
ANDREW J. FRIEDMAN.
BY
Lockwood, Galt, Woodard & Smith
ATTORNEYS.

United States Patent Office 2,834,483
Patented May 13, 1958

2,834,483

SILAGE DISTRIBUTOR AND SUPPORTING STRUCTURE THEREFOR

Andrew J. Friedman, West Lafayette, Ind.

Application December 21, 1955, Serial No. 554,536

8 Claims. (Cl. 214—17)

This invention relates generally to silage distributing devices and it relates more particularly to a silage distributing assembly adapted to be hoisted to the top of a silo and secured thereto in position to receive a stream of silage from a blower pipe.

Conventional silage distributing apparatus may consist of a rotatable distributing mechanism attached to the open end of a blower pipe where it terminates over the top of the silo. Another conventional form of silage distributing apparatus is adapted to be located beneath the outlet of a blower pipe and mounted on a platform extending across the top of a silo and supported thereon. Both of these conventional arrangements make it necessary for a farmer to work over an empty silo in order to install a silage distributor. Since silos can be 40 feet to 60 feet in height and since many individuals do not like to work at such heights, it has been difficult to merchandise silage distributing devices of the type described.

The principal object of this invention is to provide a silage distributor assembly adapted to be pre-assembled, hoisted to the top of a silo and fastened thereto with the distributor portion of the assembly adjustably mounted for positioning in operative relation to a blower pipe.

Another object of this invention is to provide a silage distributor assembly of such character that it may be clamped to the outer wall of a silo and placed in position to distribute silage without requiring any installation work over the space within the silo.

In accordance with this invention, there is provided a silage distributor assembly comprising a bracket having a slidable platform and a silage distributor mounted thereon, and a clamp adapted to embrace the top edge of a silo and including a hook for supporting said bracket, together with pulleys adapted to receive a hoisting line, whereby the silage distributor assembly may be hoisted to the top of a silo from the ground and placed in supporting engagement with said bracket-supporting hooks.

The full nature of the invention will be understood from the accompanying drawings and the following description and claims:

Fig. 1 is a side elevation, with parts broken away, of a silo and the silage distributor assembly, illustrating the method of hoisting the silage distributor assembly to the top of a silo; and Fig. 2 is a side elevation view of the silage distributor assembly mounted at the top of a silo.

This invention comprises a silage distributing assembly consisting of a distributor 10 which may be similar in structure to that disclosed in my co-pending application Serial No. 447,063, filed August 2, 1954, now Patent No. 2,788,115. For supporting the distributor 10 at the top of a silo 11, there is provided a bracket having a rectangular platform frame 12 and a rectangular brace member 14 hinged to one end of frame 12 by means of conventional hinge members 15 and 16. Frames 12 and 14 may be formed of pipe or other like metallic tubing.

The frame 12 is provided with a sliding platform 17 having tubular end members 18 and 19 resting on the side members of frame 12. The members 18 and 19 may be connected by struts 20 and 21 on which the legs 22 of distributor 10 may be bolted or otherwise secured. For pulling the platform 17 back and forth on the frame 12, there is provided a rope 22a tied or otherwise fastened as at 23 to the strut 20 and running over a pulley 24, over the opposite end of frame 12 and back to the strut member 21 for fastening thereto as at 25. The platform 17 and therewith the distributor 10 may be moved back and forth on frame 12 by means of rope 22a from either end of frame 12.

In order that it shall not be necessary for the person installing this apparatus to work over an empty silo, there is provided a clamp 26, one arm 27 of which may engage the outer side of silo 11 and the other arm 28 of which may engage the inner side of silo 11. For pulling the arms 27 and 28 into clamping engagement with the silo wall, a pair of screw members 29 and 30 may be secured to arm 27 in any suitable fashion and extended between the side members 31 and 32 of arm 28. The screw 29 may have a nut 34 engaging the inner side of arm 28 while screw 30 may have a nut 35 engaging the outer side of arm 28. The clamp 26 may be placed over the top edge of the silo wall and the nut 35 may be tightened to engage arms 27 and 28 with the wall, while nut 34 may be tightened to pivot the arm 28 to a slight degree on the screw 30 so that the lower ends of members 31, 32 have a tendency to dig into the silo wall, thereby to prevent any loosening of the clamp.

The clamp 26 is provided with pulleys 36 and 37 mounted on the upper ends of arms 27 and 28, respectively, so that a hoisting line 39 may be passed over pulleys 36 and 37 for hoisting the distributor and bracket to the top of the silo. For supporting the platform arm 12, a pair of hook members 40 are secured to the lower ends of arms 31 and 32, respectively, so that when the bracket is hoisted to the top of the silo the platform arm 12 may be engaged with hooks 41 on the outer ends of members 40.

The bracing arm 14 of the bracket is provided with a chain 42, secured to opposite corners 43 and 44 of the free end of arm 14, and including hooks 45 and 46 which may be hooked over the hook members 40 to hold the bracket arm 14 in position to support the hinged end of the bracket, as shown in Fig. 2.

The silage distributor assembly may be mounted at the top of a silo by first placing the bracket clamp 26 in position over the top edge of the silo wall. The hoisting line 39 may then be tied at one end to the chain 42. Then the platform 17 may be drawn back to the free end of platform arm 12 and rope 22a may be tied in order to hold platform 17 in this position.

In order to arrange the bracket so that it may be positioned at the top of a silo by means of hoisting line 39, the rope may be tied at an intermediate point to the free end of platform arm 12 but this section of rope should be short enough to bow the bracket as illustrated in dotted lines in Fig. 2. The rope may then be passed over the pulleys 36 and 37 and extended to the ground level on the outside of the silo whereupon it is possible to hoist the bracket to the top of the silo from the ground. When the bracket reaches the top of the silo the free end of arm 12 may be placed within the hook portions 41 of hooks 40 and the hoisting line 39 may be pulled further to lift chain 42 within reach of a man at the top of the silo. When this is done, the bracing arm 14 will have elevated arm 12 to approximately horizontal position and the hooks 45 and 46 may be engaged with the hook members 40, whereby the chain 42 will hold arm 14 in its proper position. The rope 22a may then be utilized for pulling the platform 17 and distributor 10 outwardly toward the hinged end of the bracket into a position in alignment with a blower pipe.

Where the silo wall is irregular and there is difficulty in leveling the arm 12, the rope 39 may be utilized for adjusting the position of arm 14 and the rope may be tied to the clamp for holding arm 14 in adjusted position.

From the foregoing description it will be apparent that the apparatus as provided by this invention makes it possible to mount a silage distributor in the top portion of a silo without any work being done over the empty silo.

The invention claimed is:

1. A silage distributor assembly adapted to be hoisted to the top of a silo and secured thereto, comprising a collapsible bracket having a platform arm, a bracing arm hinged at one end to one end of said platform arm, and a slidable platform on said platform arm, a distributor mounted on said platform, a line attached to said platform and arranged for sliding said platform from one end of said platform arm to the other, a clamp mountable over the top edge of a silo wall and including hooks for engaging the free end of said platform arm, said clamp including pulleys for guiding a hoisting rope when said bracket is hoisted into engagement with said hooks, and ties connecting the free end of said platform arm to the free end of said bracing arm to hold the free end of said bracing arm in spaced relation to and below the hook engaged end of said platform arm, thereby to support said distributor in operative position.

2. A silage distributor assembly adapted to be hoisted to the top of a silo and secured thereto, comprising a collapsible bracket having a platform arm, a bracing arm hinged at one end to one end of said platform arm, and a slidable platform on said platform arm, a distributor mounted on said platform, a line attached to said platform and arranged for sliding said platform from one end of said platform arm to the other, a clamp mountable over the top edge of a silo wall and including hooks for engaging the free end of said platform arm, and ties connecting the free end of said platform arm to the free end of said bracing arm to hold the free end of said bracing arm in spaced relation to and below the hook engaged end of said platform arm, thereby to support said distributor in operative position.

3. A silage distributor assembly adapted to be hoisted to the top of a silo and secured thereto, comprising a collapsible bracket having a distributor supporting arm, a bracing arm hinged at one end to one end of said distributor supporting arm, and a movable platform on said distributor supporting arm, a distributor mounted on said platform, and a clamp mountable over the top edge of a silo wall and including hooks for engaging the free end of said distributor supporting arm, said clamp including pulleys for guiding a hoisting rope when said bracket is hoisted into engagement with said hooks, and ties connecting the free end of said distributor supporting arm to the free end of said bracing arm to hold the free end of said bracing arm in spaced relation to and below the hook end of said distributor supporting arm, thereby to support said distributor in operative position.

4. A silage distributor assembly adapted to be hoisted to the top of a silo and secured thereto, comprising a collapsible bracket having a distributor supporting arm, a bracing arm hinged at one end to one end of said distributor supporting arm, a distributor movably mounted on said distributor supporting arm, a line attached to said distributor and arranged for sliding said distributor from one end of said distributor supporting arm to the other, a clamp mountable over the top edge of a silo wall and including hooks for engaging the free end of said distributor supporting arm, and ties connecting the free ends of said bracket arms to hold the free end of said bracing arm in spaced relation to and below the hook engaged end of said distributor supporting arm, thereby to support said distributor in operative position.

5. A silage distributor assembly adapted to be hoisted to the top of a silo and secured thereto, comprising a collapsible bracket having a distributor supporting arm, a bracing arm hinged at one end to one end of said distributor supporting arm, a distributor movably mounted on said distributor supporting arm, means mountable over the top edge of a silo wall and including supporting members for engaging the free end of said distributor supporting arm, and ties connecting the free ends of said bracket arms to hold the free end of said bracing arm in spaced relation to and below the supporting member engaged end of said distributor supporting arm, thereby to support said distributor in operative position.

6. A silage distributor assembly adapted to be hoisted to the top of a silo and secured thereto, comprising a bracket having a distributor supporting arm, a bracing arm attached at one end to one end of said distributor supporting arm, and a movable platform on said distributor supporting arm, a clamp mountable over the top edge of a silo wall and including hooks for engaging the free end of said distributor supporting arm, said clamp including pulleys for guiding a hoisting rope when said bracket is hoisted into engagement with said hooks, and ties connecting the free ends of said bracket arms to hold the free end of said bracing arm in spaced relation to and below the hook engaged end of said distributor supporting arm, thereby to support said distributor in operative position.

7. A silage distributor assembly adapted to be hoisted to the top of a silo and secured thereto, comprising a collapsible bracket having a distributor supporting arm, a bracing arm hinged at one end to one end of said distributor supporting arm, a clamp mountable over the top edge of a silo wall and including means for supporting the free end of said distributor supporting arm, and ties connecting the free ends of said bracket arms to hold the free end of said bracing arm in spaced relation to and below the supported end of said distributor supporting arm, thereby to support said distributor in operative position.

8. A silage distributor assembly adapted to be hoisted to the top of a silo and secured thereto, comprising a bracket having a distributor supporting arm, a bracing arm attached at one end to one end of said distributor supporting arm, means mountable over the top edge of a silo wall and including a supporting member for engaging the free end of said distributor supporting arm, and tie-means connecting the free ends of said bracket arms to hold the free end of said bracing arm in spaced relation to and below the supporting member engaged end of said distributor supporting arm, thereby to support said distributor in operative position.

No references cited.